United States Patent [19]

Moore et al.

[11] Patent Number: 5,611,058

[45] Date of Patent: Mar. 11, 1997

[54] SYSTEM AND METHOD FOR TRANSFERRING INFORMATION BETWEEN MULTIPLE BUSES

[75] Inventors: Charles R. Moore; John S. Muhich; Robert J. Reese, all of Austin, Tex.

[73] Assignee: International Business Machines Corporation, Armonk, N.Y.

[21] Appl. No.: 619,100

[22] Filed: Mar. 20, 1996

Related U.S. Application Data

[63] Continuation of Ser. No. 11,041, Jan. 29, 1993, abandoned.

[51] Int. Cl.[6] ............................ G06F 13/14; G06F 13/18; G06F 13/38
[52] U.S. Cl. ........................ 395/309; 395/308; 395/294; 395/468
[58] Field of Search .................................. 395/306, 468, 395/473, 287, 290, 308, 285, 180, 309, 294, 848, 856

[56] References Cited

U.S. PATENT DOCUMENTS

| | | | |
|---|---|---|---|
| 4,096,571 | 6/1978 | Vander Mey | 395/425 |
| 4,494,193 | 1/1985 | Brahm et al. | 395/200.06 |
| 4,897,787 | 1/1990 | Kawasaki et al. | 395/375 |
| 4,908,749 | 3/1990 | Marshall et al. | 395/325 |
| 4,965,723 | 10/1990 | Kirk et al. | 395/325 |
| 4,975,838 | 12/1990 | Mizuno et al. | 395/275 |
| 5,072,369 | 12/1991 | Theus et al. | 395/425 |
| 5,133,074 | 7/1992 | Chou | 395/725 |
| 5,265,211 | 11/1993 | Amini et al. | 395/325 |
| 5,265,216 | 11/1993 | Murphy et al. | 395/325 |
| 5,274,763 | 12/1993 | Banks | 395/250 |
| 5,278,974 | 1/1994 | Lemmon et al. | 395/550 |
| 5,309,567 | 5/1994 | Mizukami | 395/325 |
| 5,317,715 | 5/1994 | Johnson et al. | 395/425 |
| 5,355,455 | 10/1994 | Hilgendorf et al. | 395/306 |
| 5,359,715 | 10/1994 | Heil et al. | 395/325 |
| 5,414,820 | 5/1995 | McFarland et al. | 395/325 |

FOREIGN PATENT DOCUMENTS

| | | | |
|---|---|---|---|
| 0392657 | 12/1989 | European Pat. Off. | G06F 12/08 |
| 0344886 | 10/1990 | European Pat. Off. | G06F 12/08 |

OTHER PUBLICATIONS

*8080 Wescon Conference Record,* 34(1990) Nov., North Hollywood, CA, US "Futurebus+ Cache Coherence" to J. Cantrell, pp. 90–94.

*Primary Examiner*—Gopal C. Ray
*Attorney, Agent, or Firm*—Michael A. Davis, Jr.

[57] ABSTRACT

A method and system are provided for transferring information between multiple buses. Information is transferred through a first bus between multiple first bus devices. Information is transferred through a second bus between multiple second bus devices. Information is transferred through logic between the first and second buses. Using the logic, an action of a first bus device is enabled in response to a condition in which a second bus device waits for the action while the first bus device waits for a separate action on the second bus.

23 Claims, 4 Drawing Sheets

SYSTEM AND METHOD FOR TRANSFERRING INFORMATION BETWEEN MULTIPLE BUSES

This is a continuation of application Ser. No. 08/011,041 filed Jan. 29, 1993, abandoned.

TECHNICAL FIELD OF THE INVENTION

This patent application relates in general to processing systems and in particular to a method and system for transferring information between multiple buses.

BACKGROUND OF THE INVENTION

According to one technique for enhancing efficiency of a data processing system, instructions are executed simultaneously by multiple process devices connected through a bus to a common memory device. One or more of the process devices can have a resident cache memory for storing frequently accessed information without having to reaccess the common memory device each time such information is needed. Coherency techniques are used to maintain the integrity of information shared between the multiple process devices, particularly the integrity of information modified by one of the process devices. Also, one or more of the process devices can support pipelining and split-transaction operations through the bus.

Some previous techniques have attempted to transfer information between multiple buses. Nevertheless, typical previous techniques have failed to reliably achieve such information transfers without being subject to unresolvable deadlock conditions, particularly where the buses operate asynchronously relative to one another, or where one or more of the buses supports coherency techniques, pipelining, or split-transaction operations.

Thus, a need has arisen for a method and system for transferring information between multiple buses, in which information is reliably transferred between multiple buses operating asynchronously relative to one another. Also, a need has arisen for a method and system for transferring information between multiple buses, in which information transfers are not subject to unresolvable deadlock conditions. Further, a need has arisen for a method and system for transferring information between multiple buses, in which one or more of the buses supports coherency techniques, pipelining, or split-transaction operations.

SUMMARY OF THE INVENTION

In a first aspect, a method and system transfer information between multiple buses. Information is transferred through a first bus between multiple first bus devices. Information is transferred through a second bus between multiple second bus devices. Information is transferred through logic means between the first and second buses. Using the logic means, an action of a first bus device is enabled in response to a condition in which a second bus device waits for the action while the first bus device waits for a separate action on the second bus.

In a second aspect, a method and system transfer information between multiple buses. Information is transferred through a first bus between multiple first bus devices. At least one of the first bus devices transfers information by completing an address phase separately from a data phase. Information is transferred through a second bus between multiple second bus devices. Using logic means, the address and data phases are monitored, and transfer of information through and between the first and second buses is regulated in response thereto.

It is a technical advantage of these aspects of the present invention that information is reliably transferred between multiple buses operating asynchronously relative to one another.

It is another technical advantage of these aspects of the present invention that information transfers are not subject to unresolvable deadlock conditions.

It is a further technical advantage of these aspects of the present invention that information is transferred between multiple buses, where one or more of the buses supports coherency techniques, pipelining, or split-transaction operations.

In a third aspect, apparatus for processing includes means for connecting the apparatus to a bus and to a control line. The apparatus further includes means for the apparatus to transfer information through the bus by completing multiple data phases each in response to a respective associated address phase. The data phases are ordered for completion in an order of the respective associated address phases. Further, the apparatus includes means for the apparatus to selectively complete a particular one of the data phases before a preceding one of the data phases in response to a state of the control line.

It is a technical advantage of this aspect of the present invention that apparatus for processing is provided for a system in which information is transferred between multiple buses without being subject to unresolvable deadlock conditions.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The preferred embodiment of the present invention and its advantages are best understood by referring to FIGS. 1–4 of the drawings, like numerals being used for like and corresponding parts of the various drawings.

Figure 1:
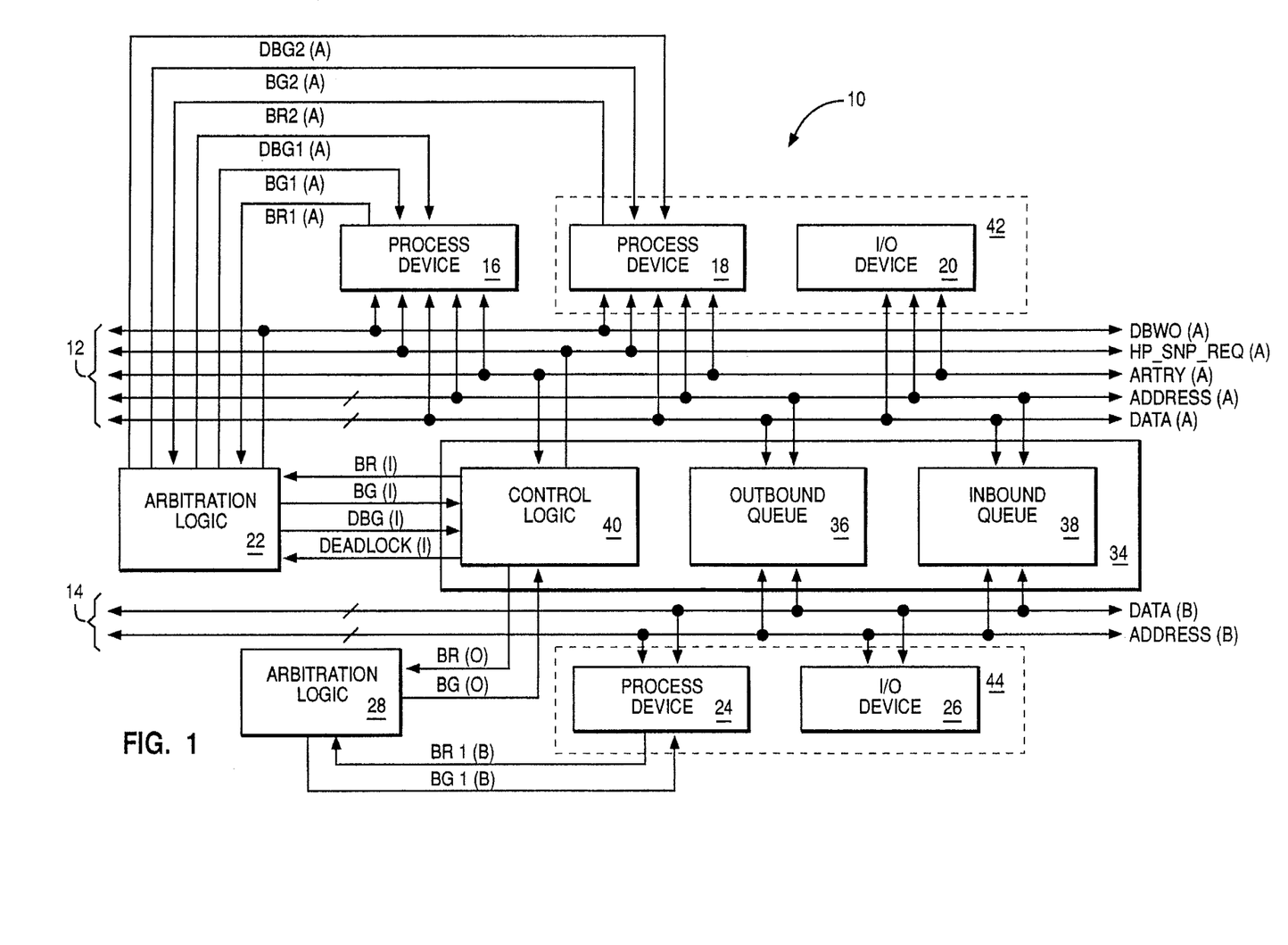
FIG. 1 is a block diagram of a system for transferring information between multiple buses according to a first exemplary embodiment.

FIG. 1 is a block diagram of a system, indicated generally at 10, for transferring information between a bus 12 and a bus 14 according to a first exemplary embodiment. Bus 12 includes an address bus ADDRESS(A) and a data bus DATA(A). Further, bus 12 includes control lines data bus write only DBWO(A), high-priority snoop request HP_SNP_REQ(A), and address retry ARTRY(A) discussed further hereinbelow. For clarity, additional control lines of bus 12 are not shown. In the preferred embodiment, address bus ADDRESS(A) is 32 bits wide, data bus DATA(A) is 64 bits wide, and each is able to operate at the full clock rate of process devices 16 and 18.

Each of process devices 16 and 18 is connected to buses ADDRESS(A) and DATA(A) and to control lines DBWO(A), HP_SNP_REQ(A) and ARTRY(A) of bus 12. An input/output ("I/O") device 20 is connected to buses ADDRESS(A) and DATA(A) and to control line ARTRY(A) of bus 12. In the preferred embodiment, I/O device 20 is a memory device. In an alternative embodiment, I/O device 20 is another type of I/O device, such as a disk storage unit or a bus interface unit.

Arbitration logic 22 is connected to control line DBWO(A). Further, arbitration logic 22 is coupled through control lines bus request BR1(A), address bus grant BG1(A), and data bus grant DBG1(A) to process device 16 as discussed further hereinbelow. Similarly, arbitration logic is coupled through control lines bus request BR2(A), address bus grant BG2(A), and data bus grant DBG2(A) to process device 18 as discussed further hereinbelow.

Bus 14 includes an address bus ADDRESS(B) and a data bus DATA(B). In an exemplary embodiment, bus 14 is structured as a NU-BUS. A process device 24 and an I/O device 26 are connected to buses ADDRESS(B) and DATA(B) of bus 14. Arbitration logic 28 is coupled through control lines bus request BR1(B) and bus grant BG1(B) to process device 24 as discussed further hereinbelow.

In an exemplary embodiment, process device 24 is a microprocessor compatible with a NU-BUS structure. In the preferred embodiment, I/O device 26 is a memory device. In an alternative embodiment, I/O device 26 is another type of I/O device, such as a disk storage unit or a bus interface unit.

Inter-bus communication logic ("ICL") 34 includes an outbound queue 36, an inbound queue 38, and control logic 40. Each of outbound queue 36 and inbound queue 38 is connected to buses ADDRESS(A), DATA(A), ADDRESS(B) and DATA(B). Control logic 40 is coupled through control lines bus request BR(I), address bus grant BG(I), data bus grant DBG(I) and DEADLOCK(I) to arbitration logic 22 as discussed further hereinbelow. Further, control logic 40 is coupled through control lines bus request BR(O) and bus grant BG(O) to arbitration logic 28 as discussed further hereinbelow. Also, control logic 40 is connected to control lines HP_SNP_REQ(A) and ARTRY(A) of bus 12.

Together, process devices 16 and 18 and I/O device 20 form a set of devices connected to bus 12. In an alternative embodiment, I/O device 20 is integral with process device 18, as indicated by dashed enclosure 42. In another alternative embodiment, the set of devices includes additional process devices and I/O devices connected to bus 12. In yet another alternative embodiment, process device 18 is not connected to bus 12.

Together, process device 24 and I/O device 26 form a set of devices connected to bus 14. In an alternative embodiment, I/O device 26 is integral with process device 24, as indicated by dashed enclosure 44. In another alternative embodiment, the set of devices includes additional process devices and I/O devices connected to bus 14.

Buses 12 and 14 are not controlled by a central arbitration device, so that information is transferred through bus 14 asynchronously relative to information transferred through bus 12. Bus 12 transfers information between ICL 34, I/O device 20, and process devices 16 and 18. Arbitration logic 22 synchronizes such information transfer by arbitrating between potential bus masters connected to bus 12, namely ICL 34 and process devices 16 and 18. A bus master controls the address or data bus, and is able to initiate or request a transaction.

A transaction is a complete exchange between bus devices. A transaction minimally includes an address transaction during an address phase in which a bus master controls the address bus. A transaction can further include one or more data transactions on the data bus during one or more data phases involved in the exchange.

Each potential bus master is coupled to arbitration logic 22 through associated bus request, address bus grant, and data bus grant control lines as discussed further hereinabove. In an alternative embodiment, additional potential bus masters are connected to bus 12, each being coupled to arbitration logic 22 through associated bus request, address bus grant, and data grant control lines.

Bus 14 transfers information between ICL 34, I/O device 26, and process device 24. Arbitration logic 28 synchronizes such information transfer by arbitrating between potential bus masters connected to bus 14, namely ICL 34 and process device 24. Each potential bus master is coupled to arbitration logic 28 through associated bus request and bus grant control lines as discussed further hereinabove. In an alternative embodiment, additional potential bus masters are connected to bus 14, each being coupled to arbitration logic 28 through associated bus request, address bus grant, and data grant control lines.

Bus 12 is connected to two bus slaves, namely I/O device 20 and ICL 34. Bus 14 is connected to two bus slaves, namely I/O device 26 and ICL 34. Accordingly, ICL 34 operates both as a bus master and as a bus slave on bus 12 and on bus 14. A bus slave is a device addressed by a bus master. The bus slave is identified during the address phase and is responsible for sourcing or sinking data for the bus master during the data phase.

Figure 2A:
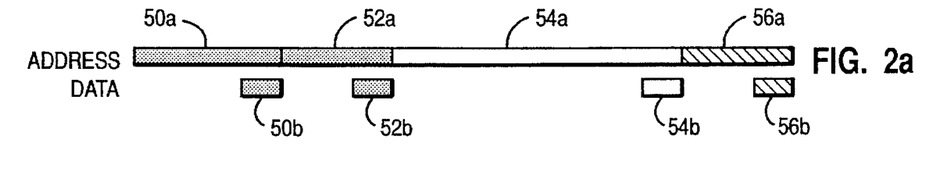
FIGS. 2a–d are illustrations of bus operations of the system of FIG. 1.

FIGS. 2a–d are illustrations of bus operations of system 10. Referring to FIG. 2a, arbitration logic 28 supports a conventional microprocessor bus protocol. For an exemplary information transfer between process device 24 and I/O device 26, process device 24 completes an address transaction on address bus ADDRESS(B) during an address phase ("tenure") 50a. In response to the address transaction on address bus ADDRESS(B), process device 24 completes a data transaction on data bus DATA(B) during a data phase ("tenure") 50b associated with address phase 50a. Similarly, later information transfer operations have address phases 52a, 54a and 56a and respectively associated data phases 52b, 54b and 56b in response thereto.

As shown in FIG. 2a, with a conventional microprocessor bus protocol, address phase 50a continues until its associated data phase 50b completes. Accordingly, after process device 24 completes an address transaction on address bus ADDRESS(B) during address phase 50a, process device 24 does not relinquish control of address bus ADDRESS(B) until after completing a data transaction on data bus DATA(B) during an associated data phase 50b. During phases 50a and 50b, process device 24 simultaneously controls address bus ADDRESS(B) and data bus DATA(B).

By comparison, arbitration logic 22 supports the decoupling of address phases on address bus ADDRESS(A) from data phases on data bus DATA(A). In this manner, arbitration logic 22 supports pipelined and split-transaction operations on bus 12. For example, process device 16 is able to initiate a second transaction on bus 12 before a first transaction has completed; moreover, process device 16 is able to split a transaction into an address transaction and a data transaction.

Figure 2B:
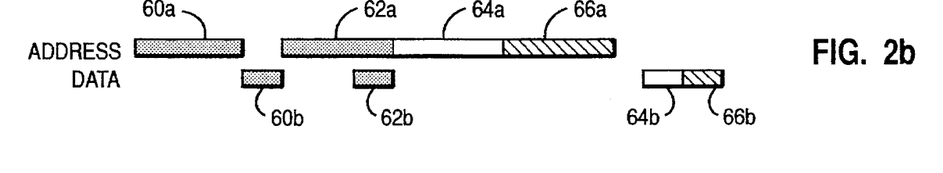

Referring to FIG. 2b, for an exemplary information transfer between process device 16 and I/O device 20, an address phase 60a completes prior to its associated data phase 60b, such that address phase 60a and its associated data phase 60b are distinct. Such a split-transaction operation allows process device 16 to control address bus ADDRESS(A) without having to control data bus DATA(A).

Accordingly, process devices 16 and 18 can minimize bus traffic by completing address-only transfers on address bus ADDRESS(A) without also using data bus DATA(A), thereby conserving data bus bandwidth. It is also possible for an address phase 62a to continue until its associated data phase 62b completes. Moreover, since address and data phases are distinct, address phases 64a and 66a for different process devices can complete before their respectively associated data phases 64b and 66b complete, thereby achieving interprocessor pipelining. Such pipelined and split-transaction operations efficiently use data bus DATA(A) by allowing back-to-back data phases such as data phases 64b and 66b, so that multiple process device transactions are efficiently interleaved on bus 12 in response to directions from arbitration logic 22.

Figure 2C:
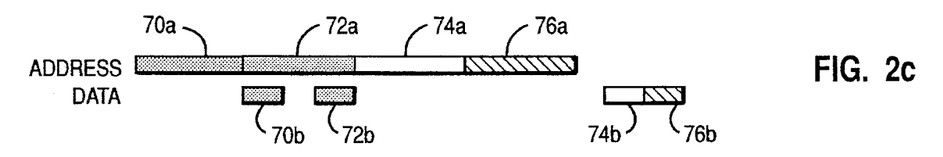

Referring to FIG. 2c, each of process devices 16 and 18 has internal queues for supporting intraprocessor pipelining. For an exemplary information transfer between process device 16 and I/O device 20, process device 16 completes an address phase 70a prior to its associated data phase 70b. During a later address phase 72a for another exemplary information transfer, data phase 70b (associated with previous address phase 70a) completes. Also during address phase 72a, its own associated data phase 72b completes.

Address phases 74a and 76a for different information transfers of process device 16 can complete before their respectively associated data phases 74b and 76b complete. For simplicity, process device 16 allows a maximum of two non-completed ("pending") data phases at any one time. Accordingly, if two data phases have not been completed, then process device 16 does not complete another address phase until one of the two pending data phases completes. In an alternative embodiment, process device 16 allows more than two pending data phases at a time.

Referring to FIG. 2b, the protocol of bus 12 normally requires that data phases 60b, 62b, 64b, and 66b complete in the order of their respective associated address phases 60a, 62a, 64a, and 66a. Likewise, referring to FIG. 2c, process device 16 by design completes data phases 70b, 72b, 74b, and 76b in the order of their respective associated address phases 70a, 72a, 74a, and 76a.

Figure 2D:
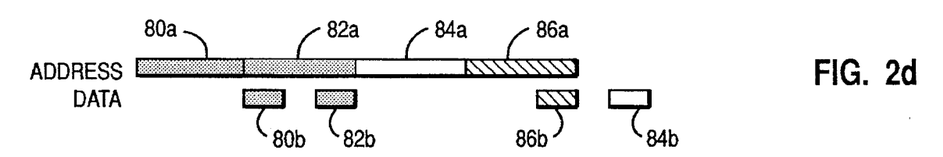

Nevertheless, referring to FIG. 2d, out-of-order split-transactions are advantageously supported by arbitration logic 22, ICL 34, and process devices 16 and 18 in certain situations as discussed further hereinbelow. In such a situation, data phases 80b, 82b, 84b, and 86b are not required to complete in the order of their respectively associated address phases 80a, 82a, 84a, and 86a. As shown in FIG. 2d, data phase 86b completes prior to data phase 84b, even though address phase 84a completes prior to address phase 86a. In this manner, the information transfer involving address phase 86a and its associated data phase 86b is "enveloped" within the information transfer involving address phase 84a and its associated data phase 84b.

Each address phase and data phase includes three phases, namely arbitration, transfer, and termination. During the arbitration phase of an address phase, arbitration logic 22 responds to bus arbitration signals and grants control of address bus ADDRESS(A) to a bus master. During the arbitration phase of a data phase, arbitration logic 22 grants control of data bus DATA(A) to a bus master. Multiple potential bus masters can compete for the shared resources of bus 12. Arbitration logic 22 supports fairness or other protocols. Moreover, arbitration logic 22 is able to park bus masters to minimize arbitration overhead, so that a bus master controls the bus without having to arbitrate for it.

During the transfer phase of an address phase, handshake lines and address bus ADDRESS(A) are operated by the bus master. During the transfer phase of a data phase, the bus master either samples or drives data bus DATA(A). During the termination phase, the phase is either terminated or signalled for retry.

Notably, the protocol of bus 14 and arbitration logic 28 fails to support pipelined and split-transaction operations. Advantageously, buses 12 and 14 operate asynchronously and are not controlled by a central arbitration device, so that bus 12 is not directly linked to bus 14. In this manner, the pipelining and split transaction advantages of bus 12 and process devices 16 and 18 are not sacrificed by directly linking bus 12 to bus 14.

Figure 3:
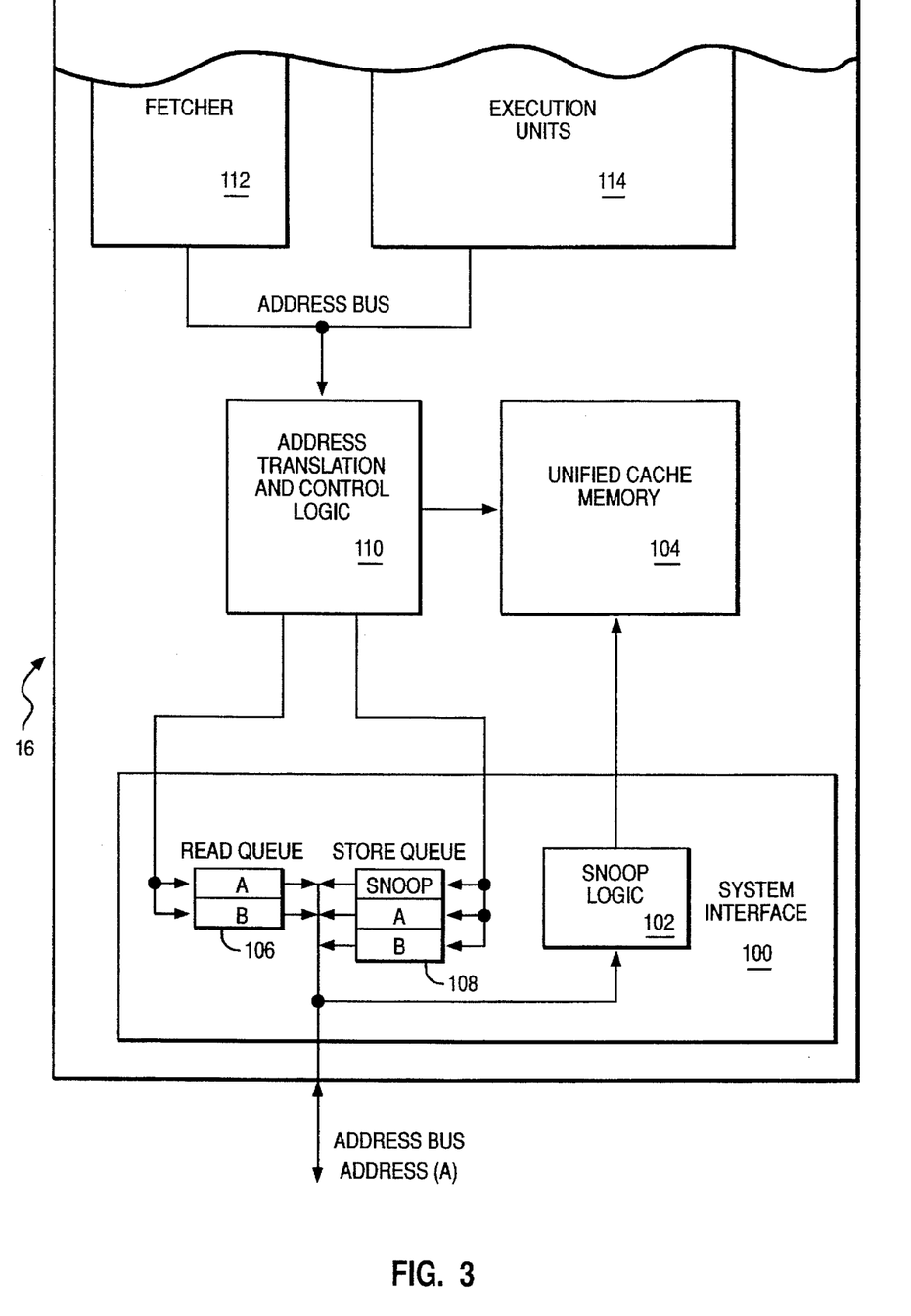
FIG. 3 is a conceptual block diagram of a system interface of a process device of FIG. 1.

FIG. 3 is a conceptual block diagram of a system interface 100 of process device 16. Process device 18 is identical in design to process device 16. System interface 100 includes snoop logic 102 coupled between a unified cache memory 104 and address bus ADDRESS(A).

Cache memory 104 stores both instructions and data. Cache memory 104 is a physically addressed and indexed 32 kilobyte cache having eight-way set associativity. Cache memory 104 is organized as eight sets of 128 sectors. Each of the 16-word cache lines include two eight-word sectors. The two sectors cache contiguous memory addresses and accordingly share a common line address tag. Cache coherency is maintained with sector granularity.

Address translation/control logic 110 is coupled to cache memory 104, to read queue 106, and to store queue 108. Further address translation/control logic 110 is coupled to an instruction fetcher 112 and to execution units 114. Execution units 114 include a floating point processor unit, a fixed point processor unit, and a branch processor unit.

Snoop logic 102 "snoops" transactions on bus 12 in order to provide coherency for cache memory 104. Coherency is a mechanism for maintaining the integrity of information shared between process devices, in particular the integrity of information modified by a process device. For coherency, process device 16 "snoops" by monitoring transactions on bus 12 to determine if coherency actions are required for cache memory 104, read queue 106, or store queue 108.

System interface 100 further includes a read queue 106 and a store queue 108, each coupled between address translation/control logic 110 and address bus ADDRESS(A).

As an example with reference to FIG. 1, process device 16 inputs information from a particular address of I/O device 20. Process device 16 modifies and stores the information in cache memory 104. Later, process device 18 attempts to input information from the particular address of I/O device 20. Snoop logic 102 of process device 16 "snoops" the address and determines that cache, memory 104 stores information in a modified state relative to associated information in I/O device 20 at the snooped address.

In response to this match, process device 16 asserts ARTRY(A) to notify process device 18 of a match with modified information in cache memory 104. Since process device 16 recognizes that process device 18 needs access to the modified information, process device 16 executes a burst write copyback ("snoop push") of the modified information to the particular address of I/O device 20. Then, process device 18 successfully inputs information from the particular address of I/O device 20.

A process device transaction can include multiple address or data beats. A burst is normally a multiple beat information transfer whose total size is equal to a cache sector. A beat is normally a single state on a process device interface that can extend across multiple bus cycles. A bus cycle is a period normally defined by the bus sampling rate.

Cache coherency is maintained on a sector granularity, so that separate coherency state bits are maintained for each sector of cache memory 104. If a first sector of a line is filled from memory, then process device 16 can attempt to load the second sector as a low-priority bus operation (referred to as a dynamic reload operation).

Cache memory 104 has a single port dedicated to the address translation/control logic 110 for fetch and load/store operations. Also, cache memory 104 has an additional port dedicated to snoop logic 102 for snooping transactions on bus 12. Accordingly, snoop operations do not degrade the fetch and load/store operations of process device 16.

Read queue 106 and store queue 108 of system interface 100 support such features as address pipelining, snooping, and write buffering. Read queue 106 includes two read queue elements, namely A and B. Together, read queue elements A and B buffer up to two pending read operations.

Store queue 108 includes three store queue elements, namely SNOOP, A and B. Store queue elements A and B buffer store operations and sector replacement castouts, so that sector replacement can precede the copyback of a modified sector from cache memory 104 to I/O device 20.

Store queue element SNOOP queues a snoop push operation (discussed further hereinbelow) ahead of operations in store queue elements A and B. Whenever a snoop push operation is needed, process device 16 places the snoop push operation in store queue element SNOOP if ICL 34 is asserting HP_SNP_REQ(A); otherwise, process device 16 places the snoop push operation in one of store queue elements A and B.

Referring again to FIG. 1, multiple potential bus masters (process device 16, process device 18, ICL 34) are supported on bus 12 by arbitration logic 22 and by coherency techniques as discussed further hereinabove. Also, multiple potential bus masters (process device 24, ICL 34) can compete for the shared resources of bus Arbitration logic 28 supports fairness or other protocols and is able to "park" bus masters to minimize arbitration overhead.

Multiprocessor software support is provided by atomic memory operations. For example, an atomic bus access can attempt to be part of a read-write operation to the same address, with no access by another bus master which causes a process device to relinquish exclusive access. The process device initiates the read and write separately, but signals the memory system that it is attempting an atomic operation. If the operation fails, status is preserved so that the process device can try again.

Referring to bus 12, a potential bus master (process device 16, process device 18, ICL 34) asserts its bus request line (BR1(A), BR2(A), BR(I)) to indicate that the potential bus master is requesting control of address bus ADDRESS(A). The potential bus master continuously asserts its bus request line when the potential bus master needs to perform a bus transaction. If parked, the bus master does not assert its bus request line. The bus request line can be asserted if the pipeline is full.

The potential bus master negates its bus request line to indicate that the potential bus master is not requesting control of address bus ADDRESS(A). In such situation, the bus master may have no bus operations pending, may be parked, or the ARTRY(A) line may have been asserted on the previous cycle of bus 12. The potential bus master negates its bus request line for at least 1 bus cycle after an accepted qualified bus grant from arbitration logic 22, even if another transaction is pending. The potential bus master also negates its bus request line for at least 1 bus cycle in response to the ARTRY(A) line being asserted.

In response to a potential bus master asserting its bus request line, arbitration logic 22 asserts the potential bus master's bus grant line (BG1(A), BG2(A), BG(I)) to indicate that the potential bus master can, with suitable qualification, assume control of address bus ADDRESS(A) on the next cycle of bus 12. Arbitration logic 22 can assert the bus grant line at any time. If the bus master needs to perform a second transaction, then the bus master again checks for a qualified assertion of its bus grant line after the first transaction's address phase completes. Negation of a potential bus master's bus grant line indicates that the potential bus master is not allowed to being use of address bus ADDRESS(A) on the next cycle of bus 12. Arbitration logic 22 asserts only one of the bus grant lines at a time, so that address bus ADDRESS(A) is controlled by only one of the potential bus masters at a time.

Control line ARTRY(A) is a bi-directional signal, allowing a potential bus master to cause other potential bus masters to retry a bus operation. A potential bus master asserts ARTRY(A) for cache/memory coherency or for hardware queuing problems. For example, ICL 34 can assert ARTRY(A) if outbound queue 36 is full.

A potential bus master asserts control line ARTRY(A) to indicate that the potential bus master detects a condition in which a snooped address phase should be reexecuted. If the potential bus master needs to copyback information to I/O device 20 as a result of the snoop, the potential bus master asserts its bus request line as discussed further hereinabove. Non-assertion of control line ARTRY(A) indicates that the snooped address phase does not need to be reexecuted.

If a bus master presently controls address bus ADDRESS(A), then assertion of ARTRY(A) indicates that the bus master should immediately negate its bus request line until one bus cycle following negation of ARTRY(A). Then, the bus master should attempt to reexecute the snooped address phase. Negation of ARTRY(A) indicates that the bus master does not need to reexecute the snooped address phase.

If the potential bus master does not presently control address bus ADDRESS(A), then assertion of ARTRY(A) indicates that the potential bus master should immediately negate its bus request line until one bus cycle following negation of ARTRY(A).

Arbitration logic 22 asserts a potential bus master's data bus grant line (DBG1(A), DBG2(A), DBG(I)) to indicate that the potential bus master can, with suitable qualification, assume control of data bus DATA(A) on the next cycle of bus 12. Arbitration logic 22 can assert the data grant line at any time. Negation of a potential bus master's data bus grant line indicates that the potential bus master is not allowed to begin use of data bus DATA(A) on the next cycle of bus 12.

Arbitration logic 22 affects pipelining by selectively asserting and negating bus grant lines (BG1(A), BG2(A), BG(I)) and data bus grant lines (DBG1(A), DBG2(A), DBG(I)). Although process device 16 can pipeline its own bus operations (intraprocessor pipelining) to a depth of one level, the maximum number of levels of pipelining that can occur on bus 12 between multiple potential bus masters (interprocessor pipelining) is not constrained.

As a bus slave on bus 12, ICL 34 inputs read and write instructions from bus 12 directed to bus 14, and ICL 34 places such instructions in outbound queue 36. As a bus master on bus 14, ICL 34 asserts BR(O) to arbitration logic 28 in order to acquire control of buses ADDRESS(B) and DATA(B) of bus 14. In response to the assertion of BR(O) by ICL 34, arbitration logic 28 grants control of bus 14 to ICL 34 at a suitable moment by asserting BG(O). In response to the assertion of BG(O) by arbitration logic 28, ICL 34 executes one or more instructions in outbound queue 36.

As a bus slave on bus 14, ICL 34 inputs read and write instructions from bus 14 directed to bus 12, and ICL 34 places such instructions in inbound queue 38. As a bus master on bus 12, ICL 34 asserts BR(I) to arbitration logic 22 in order to acquire control of bus ADDRESS(A) of bus 12. In response to the assertion of BR(I) by ICL 34, arbitration logic 22 grants control of ADDRESS(A) to ICL 34 at a suitable moment by asserting BG(I). In response to the assertion of BG(I) by arbitration logic 22, ICL 34 completes address phases for one or more instructions in inbound queue 38. At a later suitable moment, arbitration logic 22 grants control of DATA(A) to ICL 34 by asserting DBG(I). In response to the assertion of DBG(I) by arbitration logic 22, ICL 34 completes data phases associated with previously completed address phases.

As a bus master on bus 12, ICL 34 asserts control line HP_SNP_REQ(A). In response to the assertion of HP_SNP_REQ(A), process device 16 places any required snoop push operation in the store queue element SNOOP as the highest priority operation in store queue 108 (FIG. 3), so that such a snoop push operation is the next operation queued by process device 16 for bus 12.

As discussed further hereinabove in connection with FIGS. 2b–d, the protocol of bus 12 normally requires that data phases complete in the order of their respective associated address phases. Likewise, process device 16 by design completes data phases in the order of their respective associated address phases. Nevertheless, as discussed further hereinabove in connection with FIG. 2d, out-of-order split-transactions are advantageously supported by arbitration logic 22, ICL 34, and process devices 16 and 18 in certain situations.

For supporting such out-of-order split-transactions, arbitration logic 22 asserts control line DBWO(A). In response to assertion by arbitration logic 22 of control lines DBWO(A) and DBG1(A), process device 16 assumes control of data bus DATA(A) for a pending write data phase but not for a pending read data phase. After assuming control of data bus DATA(A) in such a situation, process device 16 completes the pending write data phase (associated with a previously completed write address phase) before completing a pending read data phase (associated with a previously completed read address phase), even where the associated write address phase is preceded by the associated read address phase.

In this manner, an information transfer involving a write address phase and its associated write data phase is "enveloped" within an information transfer involving a read address phase and its associated read data phase. This effectively "envelopes" a write operation within a read operation. The write operation can be a snoop push operation. Similarly, in response to assertion by arbitration logic 22 of control lines DBWO(A) and DBG2(A), process device 18 assumes control of data bus DATA(A) for a pending write data phase.

The following sequence of events describes an exemplary operation: (1) process device 16 initiates a read operation by successfully completing a read address phase without address retry, so that an associated read data phase is pending, (2) process device 16 initiates a write operation by successfully completing a write address phase without address retry, so that an associated write data phase is pending, (3) arbitration logic 22 asserts control lines DBWO(A) and DBG1(A), (4) process device 16 "envelopes" the pending write operation within the read operation, so that the write data phase completes out of order relative to the read data phase, (5) arbitration logic 22 asserts control line DBG1(A) without asserting DBWO(A), and (6) process device 16 completes the pending read data phase. Between any of these events, other potential bus masters can attempt any number of bus operations.

After asserting DBWO(A), arbitration logic 22 does not assert a potential bus master's data bus grant line until arbitration logic 22 verifies that the potential bus master has a pending write data phase. Negation of DBWO(A) indicates that each potential bus master should complete data phases in order of their respective associated address phases.

Arbitration logic 22 can assert DBWO(A) even if the potential bus master has no pending read data phase, but such an assertion of DBWO(A) has no effect on the order in which write data phases are completed. The ordering and write data phases is determined by the order of store operations in store queue 108 (FIG. 3) when BG1(A) is asserted, without regard to when DBG1(A) is asserted.

More than one write operation can be enveloped within a single read operation. For example, a snoop push operation is the highest priority write operation, but more than one snoop push operation can be in store queue 108 at a particular time. In such a situation, multiple snoop push operations can be enveloped within a single read operation.

Arbitration logic 22 monitors operations on bus 12 and synchronizes actions of bus masters and bus slaves relative to bus 12. For control, process devices 16 and 18, arbitration logic 22, and ICL 34 recognize actions as specific bus transaction types. For supporting and synchronizing pipelined, split, and out-of-order transactions, arbitration logic 22 uses control line DBWO(A) and each potential bus master's individual bus request line, bus grant line, and data bus grant line. For completing a data phase out of order relative to its associated address phase, arbitration logic 22 associates the out-of-order data phase with its originating address phase.

Significantly, system 10 supports information transfers between bus 12 and bus 14 through communication logic circuitry (including arbitration logic 22 and ICL 34). The protocol of bus 14 and arbitration logic 28 fails to support pipelined and split-transaction operations. Advantageously, buses 12 and 14 operate asynchronously and are not controlled by a central arbitration device, so that bus 12 is not directly linked to bus 14. In this manner, the pipelining and split transaction advantages of bus 12 and process devices 16 and 18 are not sacrificed by directly linking bus 12 to bus 14.

The communication logic circuitry (including arbitration logic 22 and ICL 34) transfers information between bus 12 and a non-pipelined non-split transaction bus, such as bus 14. In connection with such inter-bus transfers, a deadlock condition can result in which a second process device (such as process device connected to bus 14 waits for an action of a first process device (such as process device 16) connected to bus 12, while the first process device waits for a separate action of the second process device. In response to such a deadlock condition, the communication logic circuitry (including arbitration logic 22 and ICL 34) uses control lines DBWO(A) and DEADLOCK(I) to resolve the deadlock condition by enabling the action of the first process device connected to bus 12.

The following sequence of events describes an exemplary deadlock condition and its resolution by the communication logic circuitry (including arbitration logic 22 and ICL 34).

Event 1. Process device 18 initiates a read operation for reading information at I/O device 26 by successfully completing a read address phase without address retry, so that an associated read data phase is pending, and so that a read instruction is placed by ICL 34 in outbound queue 36.

Event 2. Process device 24 initiates a read operation for reading information at I/O device 20 by successfully completing a read address transaction so that a read instruction is placed by ICL 34 in inbound queue 38. Since the protocol of bus 14 and arbitration logic 28 fails to support pipelined and split-transaction operations, process device 24 does not relinquish control of address bus ADDRESS(B) after completing the read address transaction. Instead, process device 24 simultaneously controls address bus ADDRESS(B) and data bus DATA(B) while waiting for completion of a data transaction on data bus DATA(B).

Event 3. Control logic 40 of ICL 34 detects a potential deadlock condition in response to memory instructions being in both outbound queue 36 and inbound queue 38, simultaneously. Accordingly, control logic 40 asserts the control line DEADLOCK(I) to arbitration logic 22.

Event 4. For simplicity, process device 18 allows a maximum of two pending data phases at a time. Accordingly, in response to the assertion of DEADLOCK(I) and to process device 18 already having a pending read data phase (discussed further hereinabove in connection with Event 1), arbitration logic 22 can either (a) use BG2(A) to withhold control of address bus ADDRESS(A) from process device 18 for any subsequent bus operations except snoop push operations or (b) grant control of address bus ADDRESS(A) to process device 18 but asserts ARTRY(A) in response to any operations which are not write-to-memory operations. In one of these two manners, arbitration logic 22 makes process device 18 reserve one of the two allowed pending data phases for a needed snoop push operation.

Event 5. As a bus master on bus 12, ICL 34 asserts BR(I) to arbitration logic 22 in order to acquire control of bus ADDRESS(A) of bus 12. In response to the assertion of BR(I) by ICL 34, arbitration logic 22 grants control of ADDRESS(A) to ICL 34 at a suitable moment by asserting BG(I). In response to the assertion of BG(I) by arbitration logic 22, ICL 34 asserts HP_SNP_REQ(A) and completes an address phase for the read instruction (discussed further hereinabove in connection with Event 2) in inbound queue 38.

Event 6. Process device 18 "snoops" the address and determines that its cache memory stores information in a modified state relative to associated information in I/O device 20 at the snooped address. In response to this match, process device 18 asserts ARTRY(A) to notify ICL 34 of a match with modified information in its cache memory.

Event 7. Since process device 18 recognizes that ICL 34 needs access to the modified information, and since HP_SNP_REQ(A) is asserted, process device 18 places a snoop push operation in the store queue element SNOOP as the highest priority operation in its store queue (discussed further hereinabove in connection with FIG. 3), so that such a snoop push operation is the next operation queued by process device 18 for bus 12.

Event 8. In response to the assertion of ARTRY(A), all other potential bus masters on bus 12 besides process device 18 withdraw any bus requests. Since process device 18 asserted ARTRY(A), process device 18 asserts BR2(A). In response to the assertion of BR2(A), arbitration logic 22 asserts BG2(A). In response to the assertion of BG2(A), process device 18 initiates the snoop push operation (discussed further hereinabove in connection with Event 7) by successfully completing a write address phase without address retry, so that a write data phase is pending.

A deadlock condition results from Events 1 through 8. After Event 8, process device 18 has two pending data phases. The first pending data phase is a read data phase being deferred by process device 18 pending a separate action of process device 24, namely the relinquishing by process device 24 of control of address bus ADDRESS(B) and data bus DATA(B). Until process device 24 relinquishes control of ADDRESS(B) and DATA(B), ICL 34 is not able to read information from I/O device 26 in response to the read operation initiated by process device 18 at Event 1. Process device 18 does not complete the first pending data phase until ICL 34 is able to read such information. The second pending data phase is a write data phase being deferred by process device 18 pending completion of the first pending data phase.

Nevertheless, process device 24 waits for an action of process device 18, namely for process device 18 to complete the second pending data phase. Until process device 18 completes the second pending data phase, ICL 34 is not able to read information from I/O device 20 in response to the read operation initiated by process device 24 at Event 2. Process device 24 does not relinquish control of address bus ADDRESS(B) and data bus DATA(B) until ICL 34 is able to read such information.

In a significant aspect of the preferred embodiment, bus arbitration logic 22 detects (1) that process device 18 has a pending read data phase followed by a pending write data phase and (2) that ICL 34 is asserting DEADLOCK(I) to indicate a potential deadlock condition. In such a situation, bus arbitration logic 22 advantageously gives control of data bus DATA(A) to process device 18 by asserting DBG2(A) while simultaneously asserting DBWO(A). In response to the assertion of DBG2(A) and DBWO(A), process device 18 "envelopes" the pending snoop push operation within the read operation, so that the pending write data phase completes out of order relative to the pending read data phase.

Then, process device 18 has one pending read data phase remaining, and ICL 34 has a pending read data phase. If arbitration logic 22 granted control of DATA(A) to process device 18, then the deadlock condition would continue. Accordingly, in response to the continued assertion by ICL 34 of DEADLOCK(I), arbitration logic 22 grants control of DATA(A) to ICL 34 by asserting DBG(I).

In response to the assertion of DBG(I), ICL 34 reads information through data bus DATA(A) from I/O device 20 according to the read operation initiated by process device 24 at Event 2, so that the pending read data phase of ICL 34 is complete. ICL 34 then transfers such information to process device 24 through data bus DATA(B) and negates DEADLOCK(I).

After process device 24 completes its read operation by inputting such information, it relinquishes control of address bus ADDRESS(B) and data bus DATA(B). After process device 24 relinquishes such control of bus 14, arbitration logic 28 grants control of bus 14 to ICL 34 by asserting BG(O) in response to an assertion by ICL 34 of BR(O). Then, ICL 34 reads information from I/O device 26 according to the read operation initiated by process device 18 at Event 1.

Since DEADLOCK(I) is not asserted, arbitration logic 22 grants control of DATA(A) to process device 18 by asserting DBG2(A) without asserting DBWO(A). In response to the assertion of DBG2(A), process device 18 inputs information through data bus DATA(A) from ICL 34 according to the read operation initiated by process device 18 at Event 1, so that the pending read data phase of process device 18 is complete.

Figure 4:
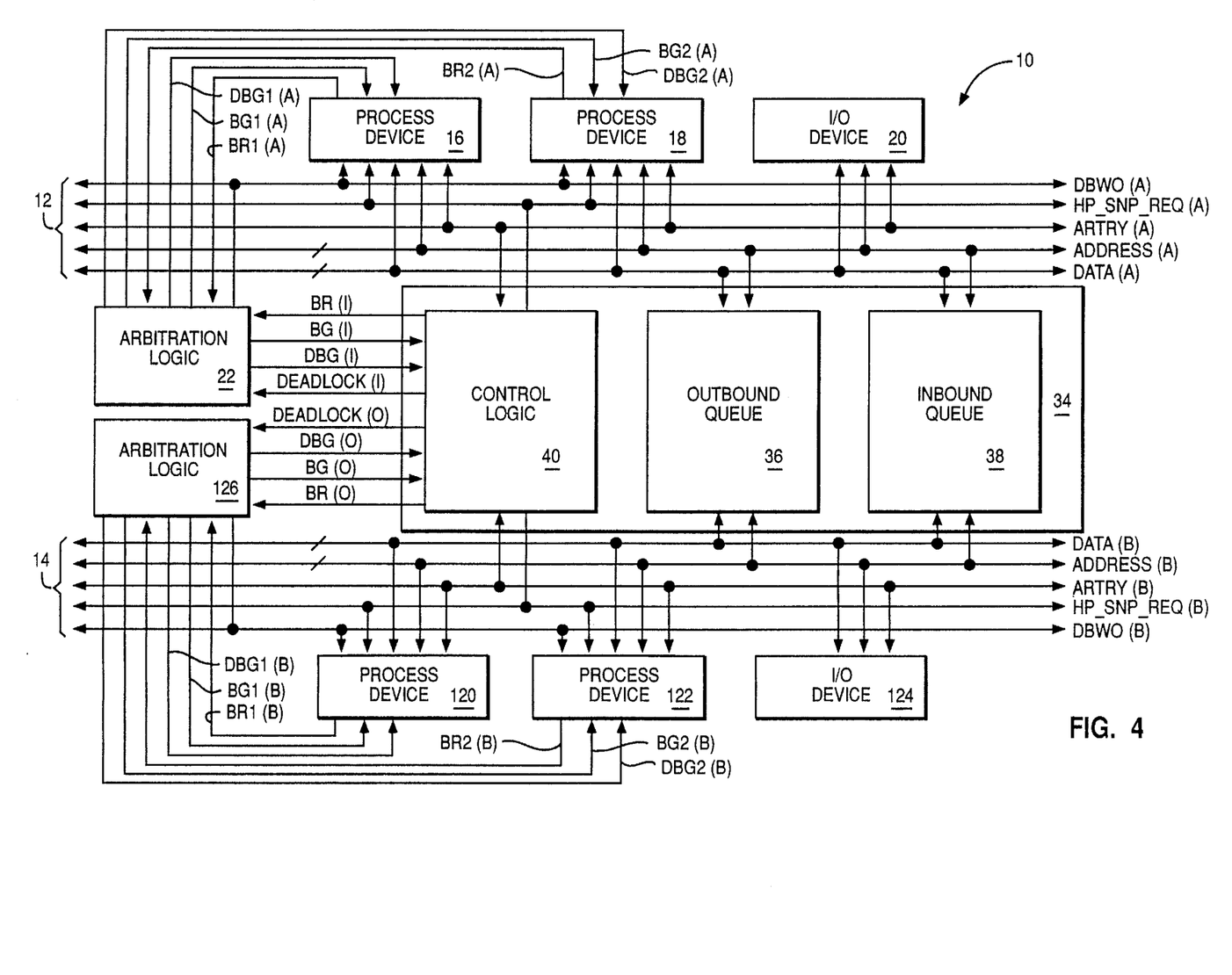
FIG. 4 is a block diagram of a system for transferring information between multiple buses according to a second exemplary embodiment.

FIG. 4 is a block diagram of a second exemplary embodiment of system 10. As shown in FIG. 4, system 10 is the same as in FIG. 1, except that process device 24, I/O device 26, and arbitration logic 28 are replaced. In their place, FIG. 4 shows a process device 120, a process device 122, an I/O device 124, and arbitration logic 126.

Process devices 120 and 122 are identical in design to process devices 16 and 18. Moreover, arbitration logic 126 is identical in design to arbitration logic 22. As shown in FIG. 4, bus 14 is identical in design to bus 12. Bus 14 includes an address bus ADDRESS(B), a data bus DATA(B), and control lines ARTRY(B), HP_SNP_REQ(B), and DBWO(B). Likewise, control lines DEADLOCK(O), DBG(O), BG(O), and BR(O) of FIG. 4 are identical in design to control lines DEADLOCK(I), DBG(I), BG(I), and BR(I), respectively.

Concerning system 10 as shown in FIG. 4, the following sequence of events describes an exemplary deadlock condition and its resolution by the communication logic circuitry (including arbitration logic 22, arbitration logic 126, and ICL 34).

Event 1. Process device 18 initiates a read operation for reading information at I/O device 124 by successfully completing a read address phase without address retry, so that an associated read data phase is pending, and so that a read instruction is placed by ICL 34 in outbound queue 36.

Event 2. Process device 120 initiates a read operation for reading information at I/O device 20 by successfully completing a read address phase without address retry, so that an associated read data phase is pending, and so that a read instruction is placed by ICL 34 in inbound queue 38.

Event 3. Control logic 40 of ICL 34 detects a potential deadlock condition in response to memory instructions being in both outbound queue 36 and inbound queue 38, simultaneously. Accordingly, control logic 40 asserts control line DEADLOCK(I) to arbitration logic 22 and asserts control line DEADLOCK(O) to arbitration logic 126.

Event 4. In response to the assertion of DEADLOCK(I) and to process device 18 already having a pending read data phase, arbitration logic 22 makes process device 18 reserve one of its two allowed pending data phases for a needed snoop push operation. Alternatively, in response to the assertion of DEADLOCK(O) and to process device 120 already having a pending read data phase, arbitration logic 126 makes process device 120 reserve one of its two allowed pending data phases for a needed snoop push operation.

Event 5. As a bus master on bus 12, ICL 34 asserts BR(I) to arbitration logic 22 in order to acquire control of bus ADDRESS(A) of bus 12. In response to the assertion of BR(I) by ICL 34, arbitration logic 22 grants control of ADDRESS(A) to ICL 34 at a suitable moment by asserting BG(I). In response to the assertion of BG(I) by arbitration logic 22, ICL 34 asserts HP_SNP_REQ(A) and completes an address phase for the read instruction (discussed further hereinabove in connection with Event 2) in inbound queue 38.

Event 6. Process device 18 "snoops" the address and determines that its cache memory stores information in a modified state relative to associated information in I/O device 20 at the snooped address. In response to this match, process device 18 asserts ARTRY(A) to notify ICL 34 of a match with modified information in its cache memory.

Event 7. Since process device 18 recognizes that ICL 34 needs access to the modified information, and since HP_SNP_REQ(A) is asserted, process device 18 places a snoop push operation in the store queue element SNOOP as the highest priority operation in its store queue, so that such a snoop push operation is the next operation queued by process device 18 for bus 12.

Event 8. In response to the assertion of ARTRY(A), all other potential bus masters on bus 12 besides process device 18 withdraw any bus requests. Since process device 18 asserted ARTRY(A), process device 18 asserts BR2(A). In response to the assertion of BR2(A), arbitration logic 22 asserts BG2(A). In response to the assertion of BG2(A), process device 18 initiates the snoop push operation by successfully completing a write address phase without address retry, so that a write data phase is pending.

Event 9. As a bus master on bus 14, ICL 34 asserts BR(O) to arbitration logic 126 in order to acquire control of bus ADDRESS(B) of bus 14. In response to the assertion of BR(O) by ICL 34, arbitration logic 126 grants control of ADDRESS(B) to ICL 34 at a suitable moment by asserting BG(O). In response to the assertion of BG(O) by arbitration logic 126, ICL 34 asserts HP_SNP_REQ(B) and completes an address phase for the read instruction (discussed further hereinabove in connection with Event 1) in outbound queue 36.

Event 10. Process device 120 "snoops" the address and determines that its cache memory stores information in a modified state relative to associated information in I/O device 124 at the snooped address. In response to this match, process device 120 asserts ARTRY(B) to notify ICL 34 of a match with modified information in its cache memory.

Event 11. Since process device 120 recognizes that ICL 34 needs access to the modified information, and since HP_SNP_REQ(B) is asserted, process device 120 places a snoop push operation in the store queue element SNOOP as the highest priority operation in its store queue, so that such a snoop push operation is the next operation queued by process device 120 for bus 14.

Event 12. In response to the assertion of ARTRY(B), all other potential bus masters on bus 14 besides process device 120 withdraw any bus requests. Since process device 120 asserted ARTRY(B), process device 120 asserts BR1(B). In response to the assertion of BR1(B), arbitration logic 126 asserts BG1(B). In response to the assertion of BG1(B), process device 120 initiates the snoop push operation by successfully completing a write address phase without address retry, so that a write data phase is pending.

A deadlock condition results from Events 1 through 12. After Event 12, process device 18 has two pending data phases, and process device 120 has two pending data phases. The first pending data phase of process device 18 is a read data phase being deferred by process device 18 pending a separate action of process device 120, namely for process device 120 to complete its second pending data phase. Until process device 120 completes its second pending data phase, ICL 34 is not able to read information from I/O device 124 in response to the read operation initiated by process device 18 at Event 1. Process device 18 does not complete its first pending data phase until ICL 34 is able to read such information. The second pending data phase of process device 18 is a write data phase being deferred by process device 18 pending completion of its first pending data phase.

Nevertheless, process device 120 waits for an action of process device 18, namely for process device 18 to complete its second pending data phase. Until process device 18 completes its second pending data phase, ICL 34 is not able to read information from I/O device 20 in response to the read operation initiated by process device 120 at Event 2. Process device 120 does not complete its first pending data phase until ICL 34 is able to read such information. The second pending data phase of process device 120 is a write data phase being deferred by process device 120 pending completion of its first pending data phase.

In a significant aspect of the preferred embodiment, bus arbitration logic 22 detects (1) that process device 18 has a pending read data phase followed by a pending write data phase and (2) that ICL 34 is asserting DEADLOCK(I) to indicate a potential deadlock condition. In such a situation, bus arbitration logic 22 advantageously gives control of data bus DATA(A) to process device 18 by asserting DBG2(A) while simultaneously asserting DBWO(A). In response to the assertion of DBG2(A) and DBWO(A), process device 18 "envelopes" its pending snoop push operation within its read operation, so that its pending write data phase completes out of order relative to its pending read data phase.

In response to the continued assertion by ICL 34 of DEADLOCK(I), arbitration logic 22 grants control of DATA(A) to ICL 34 by asserting DBG(I). In response to the assertion of DBG(I), ICL 34 reads information through data bus DATA(A) from I/O device 20 according to the read operation initiated by process device 120 at Event 2, so that the pending read data phase of ICL 34 is complete. ICL 34 then transfers such information to process device 120 through data bus DATA(B) and negates DEADLOCK(I) and DEADLOCK(O), such that the deadlock condition is resolved.

Alternatively, bus arbitration logic 126 detects (1) that process device 120 has a pending read data phase followed by a pending write data phase and (2) that ICL 34 is asserting DEADLOCK(O) to indicate a potential deadlock condition. In such a situation, bus arbitration logic 126 advantageously gives control of data bus DATA(B) to process device 120 by asserting DBG1(B) while simultaneously asserting DBWO(B). In response to the assertion of DBG1(B) and DBWO(B), process device 120 "envelopes" its pending snoop push operation within its read operation, so that its pending write data phase completes out of order relative to its pending read data phase.

In response to the continued assertion by ICL 34 of DEADLOCK(O), arbitration logic 126 grants control of DATA(B) to ICL 34 by asserting DBG(O). In response to the assertion of DBG(O), ICL 34 reads information through data bus DATA(B) from I/O device 124 according to the read operation initiated by process device 18 at Event 1, so that the pending read data phase of ICL 34 is complete. ICL 34 then transfers such information to process device 18 through data bus DATA(A) and negates DEADLOCK(I) and DEADLOCK(O), such that the deadlock condition is resolved.

Control line DBWO(A) is further useful for certain external queued controller situations, and for more complex memory operations such as a "dump and run" operation. For example, control line DBWO(A) is useful where a modified cache memory sector is castout to memory buffers while the memory is being accessed for a load operation. Preferably, such a castout is input by the memory system without negatively impacting the load memory latency. Since process device 16 can pipeline transactions, a data bus transaction can be pending while an address bus transaction is retried.

Although the present invention and its advantages have been described in detail, it should be understood that various changes, substitutions and alterations can be made therein without departing from the spirit and scope of the invention as defined by the appended claims.

What is claimed is:

1. A system for transferring information between multiple buses, comprising:

a first bus for transferring information between a plurality of first bus devices by completing multiple data phases in response to respective associated address phases, said data phases being ordered for completion in an order of said respective associated address phases;

a second bus for transferring information between a plurality of second bus devices; and logic means coupled to said first and second buses for transferring information between said first and second buses and for enabling an action of a first bus device in response to a condition in which a second bus device waits for said action while said first bus device waits for a separate action on said second bus, wherein said action includes completing a particular one of said data phases before a preceding one of said ordered data phases, said preceding data phase being deferred by said first bus device pending said separate action.

2. The system of claim 1 wherein said plurality of first bus devices includes an input/output device, and wherein said action includes an output by said first bus device of particular information to said input/output device.

3. The system of claim 2 wherein said input/output device is a memory device.

4. The system of claim 3 wherein said action includes an output of said particular information from a cache memory of said first bus device to said memory device.

5. The system of claim 4 wherein said action is in response to said second bus device attempting to access said memory device while said particular information in said cache memory is in a modified state relative to associated information in said memory device.

6. The system of claim 1 wherein said logic means enables said action by enabling said first bus device to complete said particular data phase before said preceding data phase.

7. The system of claim 6 wherein said particular data phase is a write data phase, and wherein said preceding data phase is a read data phase.

8. The system of claim 1 wherein said second bus transfers information asynchronously relative to information transferred through said first bus.

9. The system of claim 1 wherein said separate action includes a release by said second bus device of control of said second bus.

10. The system of claim 1 wherein said plurality of first bus devices includes an input/output device integral with said first bus device, and wherein said action includes an output by said input/output device of particular information to said logic means.

11. The system of claim 1 wherein said plurality of second bus devices includes an input/output device integral with said second bus device, and wherein said separate action includes an output by said input/output device of particular information to said logic means.

12. Apparatus for processing information, comprising:
    means for connecting the apparatus to a bus and to a control line having multiple states;
    means for the apparatus to transfer information through said bus by completing multiple data phases in response to respective associated address phases, said data phases being ordered for completion in an order of said respective associated address phases; and
    means for the apparatus to selectively complete a particular one of said data phases before a preceding one of said ordered data phases in response to one of said states of said control line.

13. The apparatus of claim 12 wherein said particular data phase is a write data phase, and wherein said preceding data phase is a read data phase.

14. A method of transferring information between multiple buses, comprising the steps of:
    transferring information through a first bus between a plurality of first bus devices by completing multiple data phases in response to respective associated address phases, said data phases being ordered for completion in an order of said respective associated address phases;
    transferring information through a second bus between a plurality of second bus devices;
    transferring information through logic means between said first and second buses, said logic means being coupled to said first and second buses; and
    using said logic means, enabling an action of a first bus device in response to a condition in which a second bus device waits for said action while said first bus device waits for a separate action on said second bus, wherein said action includes completing a particular one of said data phases before a preceding one of said ordered data phases, said preceding data phase being deferred by said first bus device pending said separate action.

15. The method of claim 14 wherein said enabling step comprises the step of enabling all output by said first bus device of particular information to an input/output device of said plurality of first bus devices.

16. The method of claim 15 wherein said enabling step comprises the step of enabling said output of particular information to said input/output device, said input/output device being a memory device.

17. The method of claim 16 wherein said enabling step comprises the step of enabling said output of particular information from a cache memory of said first bus device to said memory device.

18. The method of claim 17 wherein said enabling step comprises the step of enabling said output in response to said second bus device attempting to access said memory device while said particular information in said cache memory is in a modified state relative to associated information in said memory device.

19. The method of claim 14 wherein said enabling step comprises the step of enabling said first bus device to complete said particular data phase before said preceding data phase, said particular data phase being a write data phase, and said preceding data phase being a read data phase.

20. The method of claim 14 wherein said step of transferring information through said second bus comprises the step of transferring information through said second bus asynchronously relative to information transferred through said first bus.

21. The method of claim 14 wherein said enabling step comprises the step of enabling said action in response to said condition in which said first bus device waits for a release by said second bus device of control of said second bus.

22. The method of claim 14 wherein said enabling step comprises the step of enabling an output by an input/output device of particular information to said logic means, said input/output device being of said plurality of first bus devices and integral with said first bus device.

23. The method of claim 14 wherein said enabling step comprises the step of enabling said action in response to said condition in which said first bus device waits for an output by an input/output device of particular information to said logic means, said input/output device being of said plurality of second bus devices and integral with said second bus device.

* * * * *